United States Patent
Pochner et al.

(10) Patent No.: US 8,833,345 B2
(45) Date of Patent: Sep. 16, 2014

(54) ENGINE CONTROL APPARATUS AND A METHOD FOR TRANSITIONING BETWEEN AN ALL CYLINDER OPERATION MODE AND A DEACTIVATED CYLINDER OPERATION MODE OF A MULTIPLE CYLINDER INTERNAL COMBUSTION ENGINE

(75) Inventors: Klaus Pochner, Ruesselsheim (DE); Enrico Tropschug, Hattersheim (DE); Christopher Whitney, Commerce, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 518 days.

(21) Appl. No.: 13/271,992

(22) Filed: Oct. 12, 2011

(65) Prior Publication Data

US 2012/0116647 A1  May 10, 2012

(30) Foreign Application Priority Data

Oct. 15, 2010  (GB) .................................. 1017431.6

(51) Int. Cl.
| | | |
|---|---|---|
| F01D 17/02 | (2006.01) | |
| F02D 41/12 | (2006.01) | |
| F02D 41/10 | (2006.01) | |
| F02D 41/00 | (2006.01) | |
| F02D 17/02 | (2006.01) | |
| F02B 75/12 | (2006.01) | |
| F02D 41/40 | (2006.01) | |

(52) U.S. Cl.
CPC ............. *F02D 17/02* (2013.01); *F02D 41/126* (2013.01); *F02B 2075/125* (2013.01); *F02D 41/107* (2013.01); *F02D 41/401* (2013.01); *Y02T 10/123* (2013.01); *F02D 41/0087* (2013.01); *F02D 2250/21* (2013.01)
USPC ...................... 123/481; 123/198 F; 123/325

(58) Field of Classification Search
CPC ........................... F02D 41/0087; F02D 17/02
USPC ......... 123/445, 472, 478, 481, 490, 492, 493, 123/198 F, 325
See application file for complete search history.

(56) References Cited

U.S. PATENT DOCUMENTS

| | | | |
|---|---|---|---|
| 4,276,863 A | 7/1981 | Sugasawa et al. | |
| 5,119,781 A | 6/1992 | Trombley et al. | |
| 5,377,631 A | 1/1995 | Schechter | |
| 5,655,508 A | 8/1997 | Nonaka | |
| 5,685,800 A | 11/1997 | Toukura | |
| 6,360,724 B1 * | 3/2002 | Suhre et al. | 123/481 |
| 7,128,052 B1 * | 10/2006 | Reed et al. | 123/406.45 |
| 7,377,236 B2 * | 5/2008 | Reed et al. | 123/21 |
| 7,673,590 B2 * | 3/2010 | Reed et al. | 123/21 |
| 2002/0023615 A1 | 2/2002 | Dreymuller et al. | |
| 2007/0131183 A1 | 6/2007 | Shei | |
| 2010/0063713 A1 | 3/2010 | Albertson et al. | |

* cited by examiner

*Primary Examiner* — John Kwon
(74) *Attorney, Agent, or Firm* — Ingrassia Fisher & Lorenz, P.C.

(57) ABSTRACT

Engine control apparatus includes, but is not limited to a determining device for determining whether or not the engine is operated under predetermined deceleration operating conditions or predetermined acceleration operating conditions and for individually deactivating two or more cylinders in a disenabling sequence which is different from the firing sequence if the engine is operated under predetermined deceleration operating conditions, and/or for individually reactivating two or more of the cylinders in a reactivating sequence which is different from the firing sequence if the engine is operated under predetermined acceleration conditions.

20 Claims, 2 Drawing Sheets

| Firing sequence | 1 | 3 | 4 | 2 | 1 | 3 | 4 | 2 | 1 | 3 | 4 | 2 |
|---|---|---|---|---|---|---|---|---|---|---|---|---|
| Deactivating sequences | | | | | | | | | | | | |
| 1-4-3-2 | D | F | D | F | (D) | D | (D) | D | | | | |
| 4-1-3-2 | | | D | F | D | D | (D) | D | | | | |
| 3-2-1-4 | | D | F | D | D | (D) | D | | | | | |
| 2-3-1-4 | | | | D | F | D | F | (D) | D | (D) | D | |

| Firing sequence | 1 | 3 | 4 | 2 | 1 | 3 | 4 | 2 | 1 | 3 | 4 | 2 |
|---|---|---|---|---|---|---|---|---|---|---|---|---|
| Reactivating sequences | | | | | | | | | | | | |
| 1-4-2-3 | F | (D) | F | F | (F) | F | | | | | | |
| 4-1-2-3 | | | F | (D) | F | (D) | (F) | (F) | F | | | |
| 3-2-4-1 | | F | (D) | F | (D) | (F) | F | (F) | F | | | |
| 2-3-4-1 | | | | F | (D) | F | F | (F) | F | | | |

Fig. 2

ENGINE CONTROL APPARATUS AND A METHOD FOR TRANSITIONING BETWEEN AN ALL CYLINDER OPERATION MODE AND A DEACTIVATED CYLINDER OPERATION MODE OF A MULTIPLE CYLINDER INTERNAL COMBUSTION ENGINE

CROSS-REFERENCE TO RELATED APPLICATION

This application claims priority to British Patent Application No. 1017431.6, filed Oct. 15, 2010, which is incorporated herein by reference in its entirety.

TECHNICAL FIELD

The present application relates to engine control apparatus and a method for transitioning between an all cylinder operation mode and a deactivated cylinder operation mode of a multiple cylinder internal combustion engine.

BACKGROUND

The supply of fuel to all cylinders of an internal combustion engine may be interrupted during a mode of engine operation commonly known as deceleration fuel cut-off. U.S. Pat. No. 5,119,781 discloses a method of controlling engine fuel injection during transitional periods associated with deceleration fuel cut-off in order to interrupt the fuel supply to the cylinders.

Entry into the deceleration fuel cut-off mode may be initiated when the engine is decelerating, for example when the engine control element such as the throttle valve or accelerator pedal is positioned for engine idling. The deceleration fuel cut-off mode of operation may be used to reduce fuel consumption and maximize engine braking induced by the drag or negative torque applied by the engine load. Recovery from the deceleration fuel cut-off mode may be initiated when either the engine rotational speed drops below a predetermined minimum speed net idle or the engine control element is moved from the idling position to accelerate engine rotation and increase output torque. If an engine is quickly transferred from all cylinder operation to the deceleration fuel cut-off mode or vice versa, the sudden transition in engine output torque from positive to negative or negative to positive, respectively, may result in undesirable ringing or jerking in the engine driveline.

The output torque transients may be smoothed by gradually adjusting engine spark timing or the quantity of fuel injected into the engine during entry into and recovery from the deceleration fuel cut-off mode. However, both of these approaches have a negative impact on engine exhaust emissions because the amount of hydrocarbons present in the engine exhaust is increased.

Consequently, further improvements are desirable for controlling an internal combustion engine during entry and recovery from deceleration fuel cut-off. In addition, other improvements, desirable features and characteristics will become apparent from the subsequent summary and detailed description, and the appended claims, taken in conjunction with the accompanying drawings and this background.

SUMMARY

A method for transitioning between an all cylinder operation mode and a deactivated cylinder operation mode of a multiple cylinder internal combustion engine is provided. The multiple cylinders of the internal combustion engine have a firing sequence in the all cylinder operation mode. The method of transitioning comprises determining, when the engine operates in the all cylinder operation mode, whether or not the engine is operated under predetermined deceleration operating conditions. If the engine is operated under the predetermined deceleration operating conditions, two or more of the plurality of cylinders are individually deactivated in a deactivating sequence. The deactivating sequence is different from the firing sequence. Alternatively, or in addition, when the engine is operated in the deactivated cylinder operation mode, it is determined whether or not the engine is operated under predetermined acceleration operating conditions. If the engine is operated under predetermined acceleration operating conditions, two or more of the plurality of cylinders are individually reactivated in a reactivating sequence which is different from the firing sequence.

As used herein the phrase multiple cylinders has the same meaning as a plurality of cylinders. Therefore, when entering into the deceleration fuel cut-off mode by transitioning between the all cylinder operation mode to the deactivated cylinder operation mode, two or more of the plurality of cylinders are deactivated in a sequence which is different from the firing sequence. This has the advantage that the first cylinder to be deactivated can be chosen arbitrarily. Consequently, the time taken for the transition between the all cylinder operation mode and the deactivated cylinder operation mode can be reduced over a method in which the cylinders are deactivated in the firing sequence, since it is no longer necessary to wait for the first cylinder in the firing sequence to be the next cylinder due to be fired and, therefore, the first cylinder to be deactivated.

Similarly, by individually reactivating two or more of the plurality of cylinders in a reactivating sequence which is different from the firing sequence, the time taken to transition from the deceleration fuel cut-off mode, that is the deactivated cylinder operation mode to the all cylinder operation mode can be reduced over a method in which the cylinders are reactivated in the firing sequence.

In an embodiment, the two or more cylinders are individually deactivated by individually disabling fuelling of the respective cylinder. The two or more cylinders may be individually reactivated by individually re-enabling fuelling of their respective cylinder. Fuelling can be disabled and re-enabled by controlling the fuel injection valve of the respective cylinder.

Fuelling of a progressively increasing number of the multiple cylinders is disabled in the deactivating sequence to transition the engine from the all cylinder operation mode to the deactivated cylinder operation mode. Similarly, to transition the engine between the deceleration fuel cut-off mode, that is the deactivated cylinder mode and normal operation in which all cylinders are operating, fuelling of a progressively increasing number of the cylinders is re-enabled in the reactivating sequence.

The first cylinder to be deactivated in the deactivating sequence may be determined by determining the next cylinder which is due to be fired according to the firing sequence. For example, the firing sequence of an inline four cylinder engine may be 1-3-4-2. If the next cylinder due to be fired is cylinder 3, cylinder 3 may be deactivated first rather than waiting for a period in which cylinders 3, 4 and 2 are fired and then deactivating cylinder 1 when cylinder 1 becomes the next cylinder due to be fired and therefore the first cylinder to be deactivated. The second and further cylinders to be deactivated in the deactivating sequence may be determined by comparison with a look up table. This look up table comprises the allowable deactivating sequences. The reactivating sequence may be different from the deactivating sequence as well as different from the firing sequence. Therefore, the look up table may also comprise the allowable reactivating sequences so that the second and further cylinders to be reactivated in the reactivation sequence are determined by comparison with the look up table.

The cylinders may be arranged in groups in the look up table. The groups may include pairs of cylinders that are arranged alternately in the firing sequence. For example, in a four cylinder engine with a firing sequence of 1-3-4-2, the first group may include the cylinders 1 and 4 and the second group includes the cylinders 2 and 3. In the deactivating sequence or reactivating sequence, the cylinders of one group may be sequentially deactivated or reactivated, respectively. In the example of a four-cylinder engine with a firing sequence of 1-3-4-2, the cylinders 1 and 4 of the first group would be sequentially deactivated before the cylinders 2 and 3 of the second group.

Within the group, any one of the cylinders may be deactivated first. The cylinder, which is to be deactivated or reactivated first, can be determined by determining which cylinder is due to be fired next in the firing sequence. For example, if the next cylinder due to be fired is cylinder 4, cylinder 4 can be deactivated first followed by cylinder 1 of the first group.

The cylinders of the first group may be sequentially deactivated or reactivated in dependence of a torque ramp determined from the enable signal. For example, if the accelerating operating conditions indicate that it is desired to accelerate quickly, the order of the reactivating of the cylinders in the first group is chosen so that the reactivation of all of the cylinders occurs more quickly. If, however, it is determined that a slower acceleration is required, the order of the reactivation of the cylinders of the first group can be selected accordingly.

In conventional operation of an engine, i.e., in all cylinder operation modes, the fuel is injected into the cylinder before the intake valve is opened. In an embodiment, the first injection into the first cylinder, after reactivation and recovery from the deceleration fuel cut off is initiated, is delivered just before intake valve closing.

In a further embodiment, the amount of injected fuel in this first injection is increased over the normal amount of injected fuel. For example, the amount of injected fuel can be increased by approximately 10 to approximately 15%. The predetermined deceleration and acceleration conditions may be determined from an enable signal that is generated from a clutch and/or accelerator signal. For example, a signal indicating that the accelerator pedal is not depressed indicates that deceleration is required.

The application also provides engine control apparatus comprising means for determining whether or not the engine is operated under predetermined deceleration operating conditions or predetermined acceleration operating conditions. The engine control apparatus also comprises means for individually deactivating two or more of the plurality of cylinders in a deactivating sequence which is different from the firing sequence if the engine is operated under predetermined deceleration operating conditions and/or for individually reactivating two or more of the plurality of cylinders in a reactivating sequence which is different from the firing sequence if the engine is operated under predetermined acceleration conditions. The engine control system may further comprise a look up table comprising the allowable deactivating and reactivating sequences and/or groups of cylinders which are to be deactivated or reactivated sequentially. The predetermined deceleration conditions and the predetermined acceleration conditions may be determined from an enable signal. The engine control apparatus may further comprise means for generating a clutch engagement signal, means for generating an accelerated signal and means for generating an enable signal based on the clutch engagement signal and the accelerator signal.

A vehicle with a multiple cylinder internal combustion engine with the engine control apparatus is also provided. The internal combustion engine may be a spark ignition engine.

A computer program is also provided that comprises computer executable code for performing the method of one of the embodiments described above. The computer program may be stored on a data carrier such as a disk or on storage means within an engine management control unit such as a semiconductor chip.

BRIEF DESCRIPTION OF THE DRAWINGS

The present invention will hereinafter be described in conjunction with the following drawing figures, wherein like numerals denote like elements, and:

FIG. 2 illustrates deactivating sequences and reactivating sequences for transitioning the internal combustion engine from an all cylinder operation mode to a deactivated cylinder operation mode and vice versa.

DETAILED DESCRIPTION

Figure 1:
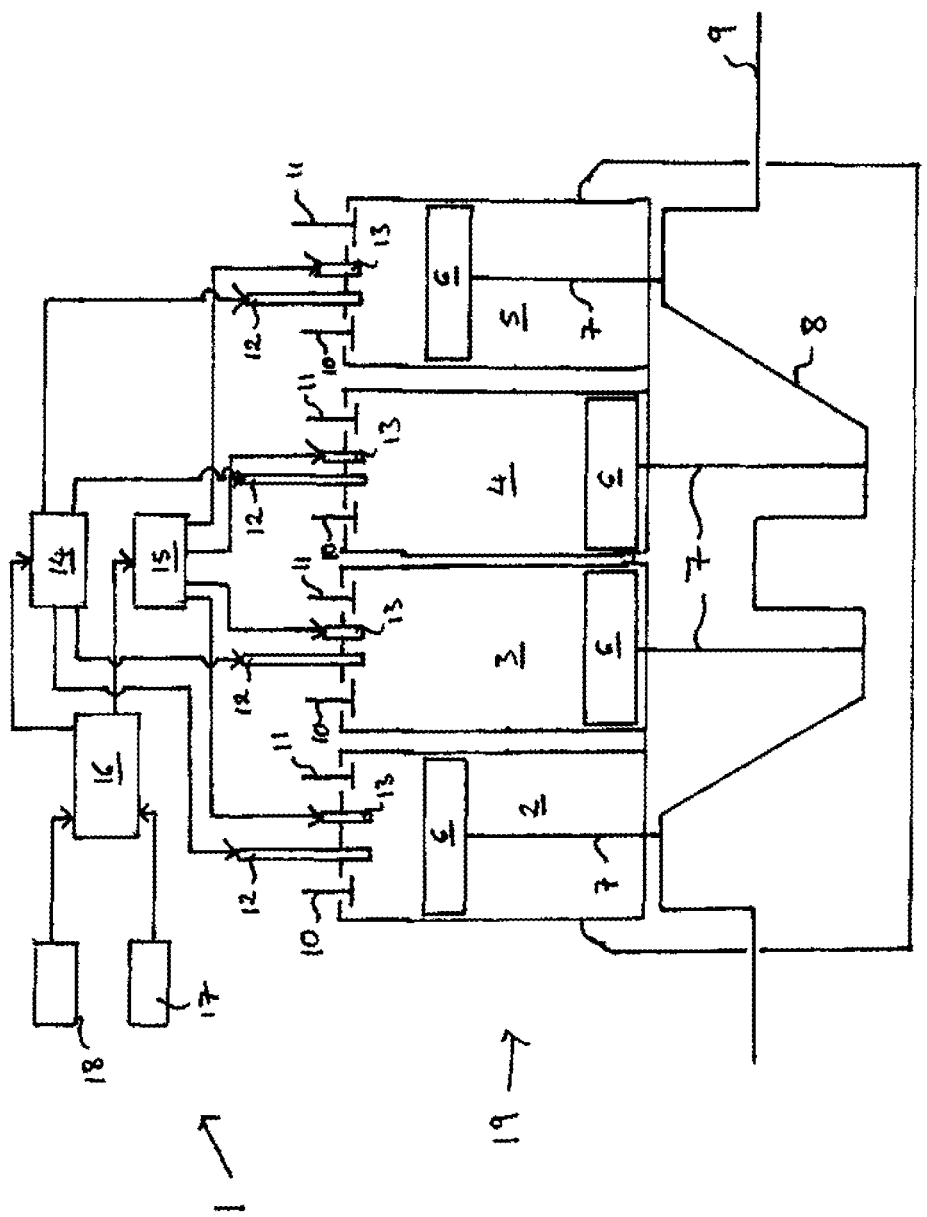
FIG. 1 illustrates internal combustion engine control apparatus according to an embodiment.

The following detailed description is merely exemplary in nature and is not intended to limit application and uses. Furthermore, there is no intention to be bound by any theory presented in the preceding background or summary or the following detailed description.

FIG. 1 illustrates control apparatus 1 for an internal combustion engine 19 which, in this embodiment, is illustrated as having four cylinders 2, 3, 4, 5 arranged in line. Each of the cylinders 2, 3, 4, 5 in combination with a reciprocating piston 6 provides a variable volume combustion chamber. The piston 6 is coupled by a rod 7 to the crankshaft 8 so that the reciprocating linear movement of the piston 6 can be translated into rotational motion by the crankshaft 8 which is used to drive a non-illustrated transmission of a non-illustrated vehicle by means of the output shaft 9.

Each cylinder 2, 3, 4, 5 comprises an intake valve 10, an exhaust valve 11, a fuel injection valve 12 and a spark plug 13. The internal combustion engine 19 is, in this embodiment, illustrated as a spark ignition engine. Each of the fuel injection valves 12 is individually operable by a first control unit 14 and each of the spark plugs 13 is individually operable by a second control unit 15. The first control unit 14 and the second control unit 15 receive signals from a further control unit 16 which may be the engine management system. The control unit 16, such as an engine control management system, receives signals from various sensors within the vehicle, one or more of which may be used to determine deceleration or acceleration of the engine 19, for example, clutch 17 and accelerator pedal 18 which are operated by the driver of the vehicle. The internal combustion engine 19 is, in this embodiment, used to drive a vehicle with a manual transmission.

The internal combustion engine 19 may be operated in an all cylinder operation mode in which each of the four cylinders 2, 3, 4, 5 is supplied with fuel by the fuel injection valve 12 and the injected fuel is ignited by means of the spark plug 13 in a conventional four stroke combustion process. The four cylinders 2, 3, 4, 5 of the internal combustion engine 19 have a firing sequence which describes the order in which the fuel is ignited within the cylinders.

The firing sequence conventionally gives using the numbering of the cylinders in a direction towards the output shaft. In the embodiment illustrated in FIG. 1, the cylinder designated with the reference number 2 is cylinder 1, the cylinder designated with the reference number 3 is cylinder 2, the cylinder designated with the reference number 4 is cylinder 3 and the cylinder designated with the reference number 5 is cylinder 4 referred to in the firing sequence. In this embodiment, the firing sequence of the cylinders is 1-3-4-2. In this firing sequence, sequentially fired cylinders are spaced from one another by a turn of the crankshaft 8 due to be arrangement of the four throws of the crankshaft 8.

In the deactivated cylinder operation mode, all of the cylinders 2, 3, 4, 5 are deactivated in the sense that no combustion takes place within the variable volume combustion chamber defined by the cylinders 2, 3, 4, 5 and the piston 6. As an increasing number of the cylinders are deactivated the torque supplied to the crankshaft and output shaft is reduced until no torque is transferred from the cylinders 2, 3, 4, 5 to the crankshaft 8 when all four cylinders are deactivated. The deactivated cylinder operation mode may be used when the vehicle is decelerating as no torque is required to be delivered to the transmission during deceleration of vehicle.

In order to transition from the all cylinder operation mode to deactivated cylinder operation mode and enter the so-called deceleration fuel cut-off, the four cylinders 2, 3, 4, 5 are deactivated or disabled by cutting off the fuel supply to the cylinders 2, 3, 4, 5. In order to prevent a rapid drop in torque, an increasing number of the four cylinders 2, 3, 4, 5 may be progressively deactivated so that the transition from four torque producing cylinders to four torque producing cylinders, to two torque producing cylinders, one torque producing cylinder and finally no torque producing cylinder is provided.

The transition from the all cylinder operation mode to the deactivated cylinder operation mode takes place by deactivating the cylinders in a deactivating sequence which is different from the firing sequence of the cylinders. The deactivating sequence is chosen so that the time taken to transition from the all cylinder operation mode to the deactivated cylinder operation mode is shorter whilst not resulting in increased engine jerk which is considered unpleasant by the driver and passengers of vehicle. The deactivation sequence differs from the firing sequence so that the first cylinder to be deactivated can be chosen arbitrarily.

The internal combustion engine 19 may be operated as follows to transition the internal combustion engine 19 from the all cylinder operation mode to the deactivated cylinder operation mode. The engine control unit 16 receives signals from the clutch 17 and/or accelerator 18 which indicate that the vehicle should be decelerated. For example, the engine control unit 16 may receive a signal that the accelerator pedal 18 is no longer activated by the driver. The engine control unit 16 provides an enable signal to the first control unit 14 which controls the supply of fuel to the fuel injection valves 12. The control unit 14 then cuts the fuel supply to the cylinders 2, 3, 4, 5 individually in a sequence which corresponds to the deactivating sequence.

In an embodiment, for a firing sequence of 1-3-4-2, the deactivating sequence is 1-4-3-2. In a deactivating sequence, fuel is cut off from the cylinders so that the following processes occur within the four cylinders 2, 3, 4, 5: deactivate cylinder 1, fire cylinder 3, deactivate cylinder 4, fire cylinder 2, cylinder 1 is already deactivated, deactivate cylinder 3, cylinder 4 is already deactivated, deactivate cylinder 2. All four cylinders are now deactivated so that the engine 19 is operated in the deactivated cylinder mode also known a deceleration fuel cut-off.

If the engine control unit 16 detects that it is now desired to accelerate the vehicle, for example, the accelerator pedal is pressed, the control unit 16 sends an enable signal to the first control unit 14 of the fuel injection valves 12 and the second control unit 15 which controls the spark plugs 13 and the ignition timing. Fuel is supplied to the cylinders 2, 3, 4, 5 in a reactivating sequence which is different from the firing sequence and different from the deactivating sequence. After fuel is injected into the cylinder in the reactivating sequence, this fuel is ignited by control of the spark plug 13 by the second control unit 15. In one embodiment, the reactivating sequence is 1-4-3-2 for firing sequence of 1-3-4-2.

FIG. 2 illustrates alternative deactivating and reactivating sequences which may be used to transition between all cylinder operation mode and deactivated cylinder operation mode and vice versa. Furthermore, FIG. 2 illustrates the deactivation of four cylinders of a four cylinder inline internal combustion engine for each of the deactivating sequences and the reactivation of the four cylinders in reactivating sequences. D is used to denote deactivating the cylinder, F is used to denote that the cylinder is fired and the brackets indicate that the cylinder is already in the deactivated state (D) or has already been reactivated and is in the firing state (F).

In a further embodiment, these deactivating and reactivating sequences are stored in a look up table which may be stored in the engine management unit and/or in one or more of the first control unit and second control unit.

In a further embodiment, only groups of cylinders are stored in the look up table and, in particular, groups of cylinders which should be deactivated or reactivated sequentially are stored in the lookup table. For example, a first group includes the cylinders 1 and 4 and a second group includes the cylinders 2 and 3 in the above embodiment of a four-cylinder internal combustion engine.

The order in which the cylinders within the group are deactivated or reactivated may be selected depending on the firing order that is the cylinder which is next due to fire in the firing order. Also, the order of the deactivation or reactivation of the first group may be chosen so as to provide a higher or lower torque ramp.

As is illustrated in FIG. 2, the torque ramp for deactivating sequence 1-4-3-2 is lower than that for the deactivating sequence 4-1-3-2 in which the order of the deactivating of the cylinders 1 and 4 of the first group is reversed as the number of events required before all of the cylinders are in the deactivated state is larger for the deactivating sequence 1-4-3-2. This is also the case for the further deactivating and reactivating sequences illustrated in FIG. 2 in which the order of the first two cylinders in the sequence is reversed.

In order to further reduce the emissions during recovery from the deceleration fuel cut off, i.e. during the transition from the deactivated cylinder operation mode to the all cylinder operation mode, the amount of fuel injected into the first cylinder to fire in the reactivating sequence may be increased over the normal amount of injected fuel. The increase may be approximately 10% to approximately 15%, for example. In a further embodiment, the fuel may be injected just before the intake valve is closed rather than just before the intake valve is opened as is the case in all cylinder operation.

Although in the embodiment illustrated in FIG. 1, the fuel injection valve control unit 14 and spark plug control unit 15 are illustrated as separate from the control unit 16, other arrangements are possible. For example, the engine control unit 16 may comprise subsystems for control of the fuel injection valves 12 and spark plugs 13 of the four cylinders 2, 3, 4, 5.

In summary, the internal combustion engine and method of transitioning between the all cylinder operation mode and the deactivated cylinder operation mode described above can be used to reduce the time delay in transitioning from the all cylinder operation mode to the deactivated cylinder operation mode in which all of the four cylinders are deactivated and, therefore, for transitioning to the minimum possible torque without the disadvantages associated with a fixed cylinder pattern such as a fixed torque ramp and a predetermined number of events between consecutive cylinders.

Compression over spark until combustion takes three quarters of an engine revolution. Injection is completed within the intake stroke and, therefore, in only half of an engine revolution. The deactivation of an arbitrary first cylinder is at most, for example, for a four-cylinder engine, another half of an engine revolution. Therefore, in total, the delay is reduced to 1¼ to 1¾ of a revolution instead of 3 to 5 revolutions if the deactivation sequence matches the firing sequence.

All of the possible permutations of the firing order that allow a smooth engine operation can be stored in the engine management system. For an in-line four cylinder engine with a firing order 1-3-4-2, the typical reactivation order would be 1-4-3-2. However, equivalent in terms of engine roughness are 4-1-3-2, 3-2-1-4 and 2-3-1-4. Depending on the steepness of the torque ramp it may also be favorable to swap the order of the third and fourth cylinder to give 1-4-2-3, 4-1-2-3, 3-2-4-1 and 2-3-4-1.

In a further embodiment, all of the possible deactivation patterns are not stored but only the so-called mandatory following pairs of cylinders 1-4 and 2-3 whilst the engine management system chooses for each pair, the cylinder which should come first. The engine control apparatus can also make use of the fact that at low engine loads, where recovery from the deactivated cylinder operation mode takes place, only a small amount of fuel can be injected which does not take the whole time of two engine revolutions between consecutive fuel boundaries. The fuel boundary represents the last time at which fuel released from the fuel injector will make it into the combustion chamber in that intake stroke. In particular, it is not necessary to maintain the optimum injection timing for stationary engine operation for the first injection after recovery from the fuel cut-off mode. Instead of using the calibrated end of injection before intake valve opening, the first injection event can be delivered as late as possible, that is just before intake valve closing.

In a further embodiment, the disadvantages of the potentially worse air/fuel mixture such as higher emissions, may be compensated by increasing the amount of injected fuel for the first injection by a given predetermined percentage, for example approximately 10% to approximately 15%. Besides improving combustion, this additional fuel can also serve to deplete the catalyst of stored oxygen from the preceding deactivated cylinder operation mode.

A disadvantage of using a torque requestor to schedule deceleration fuel cut-off can be that the torque is running independently of the ignition order of the cylinders of the engine whereas, especially for fast ramps, it is often not possible to enable or disable a cylinder at the appropriate time. One reason is that for engines with a plurality of cylinders, only those can be deactivated that have an equal separation from each other in the ignition order in order to prevent uneven engine revolution. Additionally, the fuel that has already been injected should be ignited, i.e., a spark event will only produce torque if fuel was previously injected into the same cylinder.

Therefore, if the firing order is used as the reactivating sequence, the following delay can occur. The generation of torque which takes place in the combustion stroke is typically less than a quarter engine revolution later than the spark delivery. The spark can, however, only be scheduled after decompression phase that lasts another half engine revolution. This phase is typically limited by closing the intake valve of the previous and the current cycle. This is known as the fuel boundary. Within this period that lasts another two engine revolutions the engine management system chooses the optimum injection timing to achieve good mixture preparation and good combustion. In many cases, a pre-injection is chosen which means that the fuel is completely injected before the intake valve opens. In each case, a state has to be defined for the engine management system that determines whether fuel will be injected or not and this state has to be fixed before the earliest possible start of injection, that is before the fuel boundary. If the order of activation of the cylinders is predetermined, in the worst case, it will take another two engine revolutions before the first cylinder is due according to the firing order. Therefore, in total, it will take 3 to 5 engine revolutions before a torque request can be honored. In contrast, this time delay of 3 to 5 engine revolutions can be reduced to 1¼ to 1¾ of a revolution by deactivating an arbitrary first cylinder followed by the further cylinders in a deactivating sequence which is different from the firing sequence.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for transitioning between an all-cylinder operation mode and a deactivated cylinder operation mode of a plurality of cylinders in an internal combustion engine, the plurality of cylinders having a firing sequence in the all-cylinder operation mode, the method comprising:
   determining whether the internal combustion engine is operated under predetermined deceleration operating conditions when in the all-cylinder operation mode;
   individually deactivating at least two cylinders of the plurality of cylinders in a disenabling sequence that is different from the firing sequence if the internal combustion engine is operated under predetermined deceleration operating conditions;
   determining whether the internal combustion engine is operated under predetermined acceleration operating conditions when in the deactivated cylinder operation mode; and
   individually reactivating at least two cylinders of the plurality of cylinders in a reactivating sequence which is different from the firing sequence if the internal combustion engine is operated under predetermined acceleration operating conditions.

2. The method according to claim 1, wherein the at least two cylinders are individually deactivated by individually deactivating fueling of a respective cylinder.

3. The method according to claim 1, wherein the at least two cylinders are individually reactivated by individually reactivating fuelling of the respective cylinder.

4. The method according to claim 2, wherein fuelling of a progressively increasing number of cylinders is deactivated in a deactivating sequence.

5. The method according to claim 2, wherein fuelling of a progressively increasing number of cylinders is reactivated in the reactivating sequence.

6. The method according to claim 1,
wherein a first cylinder to be deactivated is determined by determining a next cylinder which is to be fired according to the firing sequence, and
wherein the first cylinder to be reactivated is determined by determining the next cylinder which is to be fired according to the firing sequence.

7. The method according to claim 6, wherein the second and further cylinders to be deactivated are determined by comparison with a look up table comprising allowed deactivating sequences.

8. The method according to claim 6, wherein the second and further cylinders to be reactivated are determined by comparison with a look up table comprising allowed reactivating sequences.

9. The method according to claim 7,
wherein the look up table comprises groups of cylinders arranged alternately in the firing sequence, and
wherein cylinders of one group are sequentially deactivated.

10. The method according to claim 9, wherein the next cylinder of a group in the firing sequence is deactivated first.

11. The method according to claim 8, wherein cylinders of one group are sequentially deactivated before cylinders of a further group are sequentially deactivated.

12. The method according to claim 11, wherein the cylinders of the further group are sequentially reactivated in dependence of a torque ramp determined from an enable signal.

13. The method according to claim 1, wherein the reactivating sequence is different from the disenabling sequence.

14. The method according to claim 1, wherein after reactivation is initiated, a first fuel injection is delivered just before inlet valve closing.

15. The method according to claim 1, wherein an amount of injected fuel is increased over a normal amount of injected fuel for the first cylinder after initiating reactivation.

16. An engine control apparatus, comprising:
a first determinator configured to determine whether an internal combustion engine is operated under predetermined deceleration operating conditions and predetermined acceleration operating conditions;
a deactivator configured to individually deactivate two or more of a plurality of cylinders in a disenabling sequence that is different from a firing sequence if the internal combustion engine is operated under predetermined deceleration operating conditions, the deactivator further configured to individually reactivate two or more of the plurality of cylinders in a reactivating sequence which is different from the firing sequence if the internal combustion engine is operated under predetermined acceleration conditions.

17. The engine control apparatus according to claim 16, further comprising a look up table comprising allowable deactivating and reactivating sequences.

18. A computer readable medium embodying a computer program product, said computer program product comprising:
a transition program for transitioning between an all-cylinder operation mode and a deactivated cylinder operation mode of a plurality of cylinders in an internal combustion engine, the plurality of cylinders having a firing sequence in the all-cylinder operation mode, the transition program configured to:
determine whether the internal combustion engine is operated under predetermined deceleration operating conditions when in the all-cylinder operation mode;
individually deactivate at least two cylinders of the plurality of cylinders in a disenabling sequence that is different from the firing sequence if the internal combustion engine is operated under predetermined deceleration operating conditions;
determine whether the internal combustion engine is operated under predetermined acceleration operating conditions when in the deactivated cylinder operation mode; and
individually reactivate at least two cylinders of the plurality of cylinders in a reactivating sequence which is different from the firing sequence if the internal combustion engine is operated under predetermined acceleration operating conditions.

19. The computer readable medium embodying the computer program product according to claim 18, wherein the at least two cylinders are individually deactivated by individually deactivating fueling of a respective cylinder.

20. The computer readable medium embodying the computer program product according to claim 18, wherein the at least two cylinders are individually reactivated by individually reactivating fuelling of the respective cylinder.

* * * * *